(12) United States Patent
Lee et al.

(10) Patent No.: US 9,477,372 B2
(45) Date of Patent: Oct. 25, 2016

(54) CABLE READER SNIPPETS AND POSTBOARD

(71) Applicant: Palantir Technologies Inc., Palo Alto, CA (US)

(72) Inventors: Brian Lee, Sunnyvale, CA (US); Joshua Goldenberg, Menlo Park, CA (US); Drew Wolpert, Berkeley, CA (US); Dan Cervelli, Mountain View, CA (US); Brit Yonge, Vienna, VA (US); Carl Freeland, Mountain View, CA (US); Tie Zhong, Palo Alto, CA (US); Gregory Martin, Oakland, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 242 days.

(21) Appl. No.: 14/332,306

(22) Filed: Jul. 15, 2014

(65) Prior Publication Data

US 2015/0046844 A1 Feb. 12, 2015

Related U.S. Application Data

(60) Provisional application No. 61/863,814, filed on Aug. 8, 2013.

(51) Int. Cl.
 *G06F 3/0481* (2013.01)
 *H04L 12/58* (2006.01)
 *G06F 17/22* (2006.01)
 *G06F 17/24* (2006.01)
 *G06Q 10/10* (2012.01)

(52) U.S. Cl.
 CPC ......... *G06F 3/0481* (2013.01); *G06F 17/2235* (2013.01); *G06F 17/24* (2013.01); *G06Q 10/107* (2013.01); *H04L 51/36* (2013.01)

(58) Field of Classification Search
 CPC ....................................................... G06F 3/048
 See application file for complete search history.

(56) References Cited

U.S. PATENT DOCUMENTS 7,870,493 B2  1/2011  Pall et al.
8,271,461 B2  9/2012  Pike et al.
(Continued)

FOREIGN PATENT DOCUMENTS

EP   2560134   2/2013

OTHER PUBLICATIONS

Boyce, Jim, "Microsoft Outlook 2010 Inside Out," Aug. 1, 2010, retrieved from the internet https://capdtron.files.wordpress.com/2013/01/outlook-2010-Inside_out.pdf.
Brink, Shawn, "Single-Click or Double-Click to Open an Item: How to Open Items with a Single-Click or Double-Click in Windows 7 and Windows 8", http://www.sevenforums.com/tutorials/10117-single-click-double-click-open-item.html, May 15, 2009, pp. 6.
Official Communication for Australian Patent Application No. 2014210604 dated Jun. 5, 2015.

(Continued)

*Primary Examiner* — Peiyong Weng
(74) *Attorney, Agent, or Firm* — Knobbe, Martens, Olson & Bear, LLP

(57) ABSTRACT

Various systems and methods are provided that allow reviewers to quickly save, identify, retrieve, and share communications. For example, systems and methods described herein may allow a reviewer to store at least a portion of a communication, called a snippet, in a postboard. For example, a reviewer can highlight a portion of the content of a communication. Once the portion is highlighted, the reviewer can select a snippet command, which stores the highlighted portion in the postboard. Each snippet stored in a postboard includes at least a portion of the content that was highlighted and a link to the communication from which the snippet originates.

17 Claims, 14 Drawing Sheets

(56) References Cited

U.S. PATENT DOCUMENTS

| | | |
|---|---|---|
| 2003/0140106 A1 | 7/2003 | Raguseo |
| 2004/0078451 A1* | 4/2004 | Dietz ............... G06F 17/30884 709/217 |
| 2004/0143796 A1 | 7/2004 | Lerner et al. |
| 2007/0094389 A1 | 4/2007 | Nussey et al. |
| 2009/0024962 A1* | 1/2009 | Gotz ............... G06F 17/30884 715/838 |
| 2009/0249244 A1 | 10/2009 | Robinson et al. |
| 2010/0070842 A1 | 3/2010 | Aymeloglu et al. |
| 2010/0070845 A1 | 3/2010 | Facemire et al. |
| 2010/0318924 A1 | 12/2010 | Frankel et al. |
| 2012/0284345 A1 | 11/2012 | Costenaro et al. |
| 2013/0110877 A1 | 5/2013 | Bonham et al. |
| 2015/0046845 A1 | 2/2015 | Lee et al. |

OTHER PUBLICATIONS

Official Communication for Australian Patent Application No. 2014210614 dated Jun. 5, 2015.

Official Communication for European Patent Application No. 14180321.3 dated Apr. 17, 2015.

Official Communication for European Patent Application No. 14180321.3 dated May 9, 2016.

Official Communication for European Patent Application No. 14180432.8 dated Jun. 23, 2015.

Official Communication for New Zealand Patent Application No. 628150 dated Aug. 15, 2014.

Official Communication for New Zealand Patent Application No. 628161 dated Aug. 25, 2014.

\* cited by examiner

READER – ANALYST 1

17 / 84 SIEGE AT BOSNIAN PARLIAMENT ENDS

FDE 123/156747-18

Witnesses suggest about 1500 legislators and other employees were freed from parliament Friday morning by police. However, protestors remained outside the Parliamentary Assembly of Bosnia and Herzegovina building in Sarajevo. Local authorities and staff took early vacations for the week. Informants suggest protest protests will continue a week. Informants suggest protest leaders will not be turning to violence unless instigated by police.

TAG T  SNIP S

| POSTBOARDS | |
|---|---|
| 16 | Gathered supplies for the construction of paramilitary training camps<br>http://plntr/kjsdf32 |
| | Al-Qaeda has attacked civilian and military targets in various countries,....<br>http://plntr/3jhHKib |
| | Al-Qaeda ideologues envision a complete break from all foreign....<br>http://plntr/3Ajkf3 |
| 17 | Al-Qaeda is intolerant of non-Sunni branches of Islam and denounces....<br>http://plntr/09fkds |
| | Leaders regard liberal Muslims, Shias, Sufis and other sects....<br>http://plntr/ABBFsdf |
| | As a matter of law, the US Department of Justice needed to show that bin Laden....<br>http://plntr/no874d |

CREATE SUMMARY →

FIG. 3B

READER – ANALYST 1

17 / 84   SIEGE AT BOSNIAN PARLIAMENT ENDS
FDE 123/156747-18

Witnesses suggest about 1500 legislators and other employees were freed from parliament Friday morning by police. However, protestors remained outside the Parliamentary Assembly of Bosnia and Herzegovina building in Sarajevo [TAG T] [SNIP S] and staff took early vacations for the week. Local authorities are unsure whether the protests will continue or whether the violence unless instigated by police.

POSTBOARDS

16
- Gathered supplies for the construction of paramilitary training camps
  http://plntr/kjsdf32
- Al-Qaeda has attacked civilian and military targets in various countries....
  http://plntr/3jhHKib
- Al-Qaeda ideologues envision a complete break from all foreign....
  http://plntr/3Ajkf3

17
- Al-Qaeda is intolerant of non-Sunni branches of Islam and denounces...
  http://plntr/09fkds
- Leaders regard liberal Muslims, Shias, Sufis and other sects....
  http://plntr//ABBFsdf
- As a matter of law, the US Department of Justice needed to show that bin Laden....
  http://plntr/no874d

CREATE SUMMARY →

FIG. 3C

READER – ANALYST 2

17 / 84   SIEGE AT BOSNIAN PARLIAMENT ENDS

FDE 123/156747-18

Witnesses suggest about 1500 legislators and other employees were freed from parliament Friday morning by police. However, protestors remained outside the Parliamentary Assembly of Bosnia and Herzegovina building in Sarajevo as all legislators and staff took early vacations for the week. Local authorities are unsure whether the protests will continue next week. Informants suggest protest leaders will not be turning to violence unless instigated by police.

Postboard A1-A2

16  Gathered supplies for the construction of paramilitary training camps
http://plntr/kjsdf32

17  Al-Qaeda ideologues envision a complete break from all foreign....
http://plntr/3Ajkf3

Al-Qaeda is intolerant of non-Sunni branches of Islam and denounces....
http://plntr/09fkds Leaders regard liberal Muslims, Shias, Sufis and other sects....
http://plntr/ABBFsdf 18  Protestors remained outside the Parliamentary Assembly of Bosnia....
http://plntr/3jhHKib

CREATE SUMMARY →

FIG. 7B

READER – ANALYST 2

SIEGE AT BOSNIAN PARLIAMENT ENDS
FDE 123/156747-18

Witnesses suggest about 1500 legislators and other employees were freed from parliament Friday morning by police. However, protestors remained outside the Parliamentary Assembly of Bosnia and Herzegovina building in Sarajevo as all legislators and staff took early vacations for the week. Local authorities are unsure whether the protests will continue next week. Informants suggest protest leaders will not be turning to violence unless instigated by police.

Postboard A1-A2

16   Gathered supplies for the construction of paramilitary training camps
http://plntr/kjsdf32

[You do not have permission to view this snippet. Please contact your supervisor if you believe this is in error]

Al-Qaeda ideologues envision a complete break from all foreign...
http://plntr/3Ajkf3

17   Al-Qaeda is intolerant of non-Sunni branches of Islam and denounces....
http://plntr/09fkds Leaders regard liberal Muslims, Shias, Sufis and other sects....
http://plntr//ABBFsdf

[You do not have permission to view this snippet. Please contact your supervisor if you believe this is in error]

18   Protestors remained outside the Parliamentary Assembly of Bosnia....
http://plntr/3jhHkib

CREATE SUMMARY →

FIG. 7C

READER – ANALYST 2

17 / 84  SIEGE AT BOSNIAN PARLIAMENT ENDS
FDE 123/156747-18

Witnesses suggest about 1500 legislators and other employees were freed from parliament Friday morning by police. However, protestors remained outside the Parliamentary Assembly of Bosnia and Herzegovina building in Sarajevo as all legislators and staff took early vacations for the week. Local authorities are unsure whether the protests will continue next week. Informants suggest protest leaders will not be turning to violence unless instigated by police.

Postboard A1-A2

16  Gathered supplies for the construction of paramilitary training camps
    htttp://plntr/kjsdf32

Al-Qaeda ideologues envision a complete break from all foreign....
    http://plntr/3Ajkf3

17  Al-Qaeda is intolerant of non-Sunni branches of Islam and denounces....
    http://plntr/09fkds Leaders regard liberal Muslims, Shias, Sufis and other sects....
    http://plntr/ABBFsdf 18  Protestors remained outside the Parliamentary Assembly of Bosnia....
    http://plntr/3jhHKib

CREATE SUMMARY →

FIG. 7D

CABLE READER SNIPPETS AND POSTBOARD

CROSS-REFERENCE TO RELATED APPLICATIONS

This application claims a priority benefit under 35 U.S.C. §119 to U.S. Provisional Patent Application No. 61/863,814, filed on Aug. 8, 2013, and titled "CABLE READER SNIPPETS AND POSTBOARD," which is hereby incorporated by reference herein in its entirety.

TECHNICAL FIELD

The present disclosure relates to systems and techniques for data integration, analysis, and visualization.

BACKGROUND

Commercial entities, law firms, government entities, and others, gather and process an enormous amount of information. Some of the information gathered and processed is in the form of electronic messages or other such communications. These communications are generated by employees, contractors, or clients and are sent to reviewers (e.g., analysts, other employees, other contractors, other clients, etc.) for review.

In conventional systems, reviewers can locally save or store received communications for later analysis. However, because of the enormous amount of information gathered and processed, it can be difficult for reviewers to quickly save or store each and every communication that the reviewer would like to analyze at a later time. In fact, even once the communications are saved or stored, it can be time-consuming for a reviewer to identify the location of a stored communication and/or the content of a stored communication. The time-consuming nature of conventional systems may be exacerbated if a reviewer would like to share a communication with another reviewer.

SUMMARY

The systems, methods, and devices described herein each have several aspects, no single one of which is solely responsible for its desirable attributes. Without limiting the scope of this disclosure, several non-limiting features will now be discussed briefly.

A message reader snippet and postboard system is disclosed herein that allows reviewers to quickly save, identify, retrieve, and share communications. For example, the message reader snippet and postboard system described herein may allow a reviewer to store at least a portion of a communication, called a snippet, in a postboard.

In one embodiment, a reviewer can highlight a portion of the content of a communication. Once the portion is highlighted, the reviewer can select a snippet command, which stores the highlighted portion in the postboard. Each snippet stored in a postboard may include at least a portion of the content that was highlighted and a link to the communication from which the snippet originates. In some embodiments, only the reviewer that generated the snippet can view the postboard. In other embodiments, the postboard can be shared with other reviewers, such as based on sharing permissions. For example, certain communications may carry a higher access or clearance level than other communications. Thus, the access or clearance level carried by each reviewer determines what each respective reviewer can view in the shared postboard. In some embodiments, a reviewer that creates a snippet may set access rights, such as by restricting access to a group of reviewers working on a related project. Accordingly, the message reader snippet and postboard system advantageously enables reviewers to quickly save, identify, retrieve, and share communications.

One aspect of the disclosure provides a computing system configured to display a large amount of dynamically updating data. In this embodiment, the computing system comprises a network interface that is coupled to a data network for receiving and transmitting one or more packet flows. The computing system further comprises a computer processor. The computing system further comprises a computer readable storage medium storing program instructions configured for execution by the computer processor in order to cause the computing system to: access a first confidential message, wherein the first confidential message comprises text; display the first confidential message in a first view; receive a first selection of a portion of the text of the first confidential message in response to a first reviewer selecting the portion of the text of the first confidential message using a cursor; receive a second selection of a snip command while the portion of the text is selected; store the portion of the text of the first confidential message and a link to the first confidential message in a postboard shared with a second reviewer; display at least a portion of the postboard in a second view accessible by the first reviewer; and display at least a portion of the postboard in a third view accessible by the second reviewer.

The computing system of the preceding paragraph can have any sub-combination of the following features: where the one or more stored program instructions further cause the processor to: display the portion of the text of the first confidential message and the link to the first confidential message in the second view, and not display the portion of the text of the first confidential message and the link to the first confidential message in the third view; where the one or more stored program instructions further cause the processor to: display the portion of the text of the first confidential message and the link to the first confidential message in the second view, and display a message that the portion of the text of the first confidential message and the link to the first confidential message is not available for viewing in the third view; where the first confidential message is associated with a first access level, the first reviewer is associated with the first access level, and the second reviewer is associated with a second access level that is lower than the first access level; where the one or more stored program instructions further cause the processor to: receive a third selection of a second postboard after receiving the first selection, wherein the second postboard is shared with the second reviewer, and store the portion of the text of the first confidential message and the link to the first confidential message in the second postboard in response to receiving the second selection; where the second selection is received in response to the first reviewer selecting a key command while the portion of the text of the first confidential message is selected; and where the cursor comprises at least one of a mouse pointer or a finger of the first reviewer.

Another aspect of this disclosure provides a computer-implemented method of displaying a large amount of dynamically updating data. In this embodiment, the computer-implemented method comprises, as implemented by one or more computer systems comprising computer hardware and memory, the one or more computer systems configured with specific executable instructions, accessing a first message, wherein the first message comprises text;

displaying the first message in a first view; receiving a first selection of a portion of the text of the first message in response to a first user selecting the portion of the text of the first message using a cursor; receiving a second selection of a snip command while the portion of the text is selected; storing the portion of the text of the first message and a link to the first message in a postboard shared with a second user; displaying at least a portion of the postboard in a second view accessible by the first user; and displaying at least a portion of the postboard in a third view accessible by the second user.

The computer-implemented method of the preceding paragraph can have any sub-combination of the following features: where the computer-implemented method further comprises displaying the portion of the text of the first message and the link to the first message in the second view, and not displaying the portion of the text of the first message and the link to the first message in the third view; where the computer-implemented method further comprises displaying the portion of the text of the first message and the link to the first message in the second view, and displaying a second message that the portion of the text of the first message and the link to the first message is not available for viewing in the third view; where the first message is associated with a first access level, the first user is associated with the first access level, and the second user is associated with a second access level that is lower than the first access level; where the computer-implemented method further comprises receiving a third selection of a second postboard after receiving the first selection, wherein the second postboard is shared with the second user, and storing the portion of the text of the first message and the link to the first message in the second postboard in response to receiving the second selection; where receiving a second selection comprises receiving the second selection in response to the first user selecting a key command while the portion of the text of the first message is selected; and where the cursor comprises at least one of a mouse pointer or a finger of the first user.

Another aspect of this disclosure provides a non-transitory computer-readable medium comprising one or more program instructions recorded thereon, the instructions configured for execution by a computing system comprising one or more processors in order to cause the computing system to: access a first message, wherein the first message comprises text; display the first message in a first view; receive a first selection of a portion of the text of the first message; receive a second selection of a snip command while the portion of the text is selected; store the portion of the text of the first message and a link to the first message in a postboard shared with a second reviewer; display at least a portion of the postboard in a second view accessible by the first reviewer; and display at least a portion of the postboard in a third view accessible by the second reviewer.

The non-transitory computer-readable medium of the preceding paragraph can have any sub-combination of the following features: where the instructions are further configured to cause the computing system to: display the portion of the text of the first message and the link to the first message in the second view, and not display the portion of the text of the first message and the link to the first message in the third view; where the instructions are further configured to cause the computing system to: display the portion of the text of the first message and the link to the first message in the second view, and display a second message that the portion of the text of the first message and the link to the first message is not available for viewing in the third view; where the first message is associated with a first access level, the first user is associated with the first access level, and the second user is associated with a second access level that is lower than the first access level; where the instructions are further configured to cause the computing system to: receive a third selection of a second postboard after receiving the first selection, wherein the second postboard is shared with the second user, and store the portion of the text of the first message and the link to the first message in the second postboard in response to receiving the second selection; and where the second selection is received in response to the first user selecting a key command while the portion of the text of the first message is selected.

BRIEF DESCRIPTION OF THE DRAWINGS

FIGS. 3A-C illustrate example user interfaces of the message reader snippet and postboard system in which a snip command is selected.

FIGS. 7A-D illustrate an example user interface of the message reader snippet and postboard system in which a postboard shared with another user is displayed.

DETAILED DESCRIPTION

Overview

Figure 1:
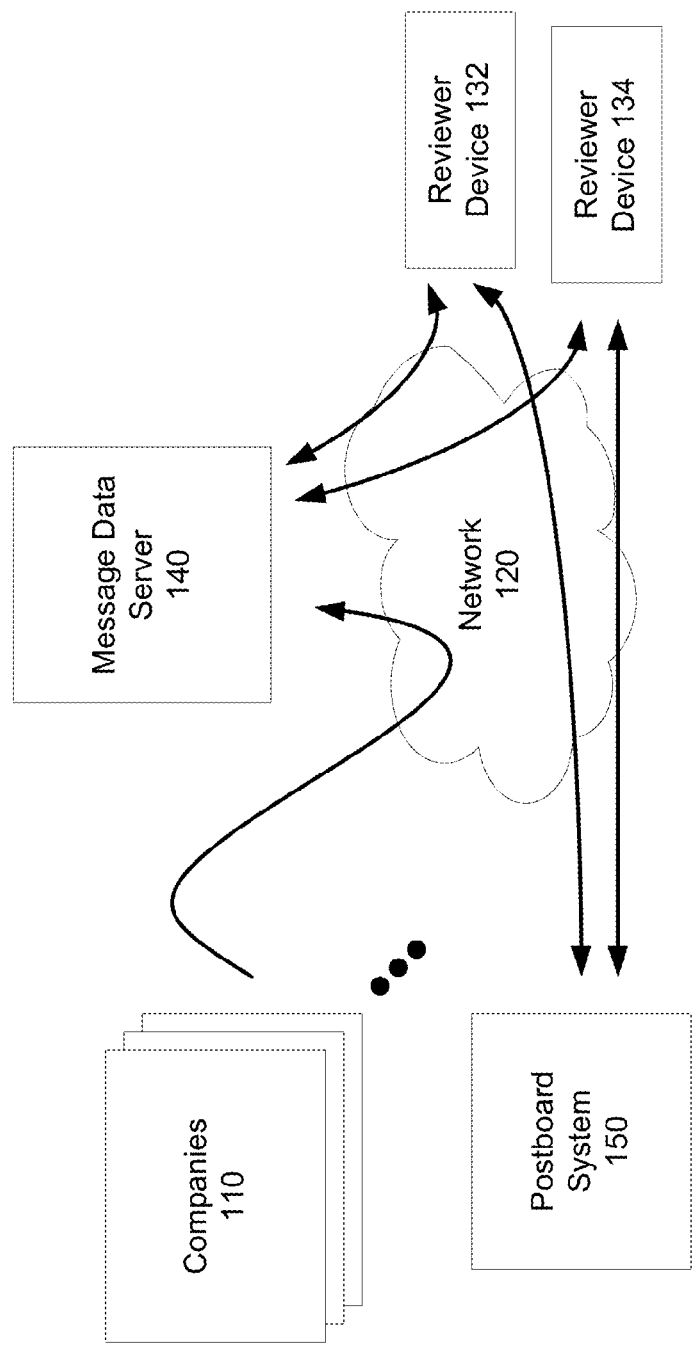
FIG. 1 illustrates a block diagram of a message reader snippet and postboard system for snipping confidential messages according to one embodiment.

Described herein are various systems and methods that allow reviewers to quickly save, identify, retrieve, and share communications. For example, systems and methods described herein may allow a reviewer to store at least a portion of a communication, called a snippet, in a postboard. For example, a reviewer can highlight a portion of the content of a communication. Once the portion is highlighted, the reviewer can select a snippet command, which stores the highlighted portion in the postboard. Each snippet stored in a postboard includes at least a portion of the content that was highlighted and a link to the communication from which the snippet originates. In some embodiments, only the reviewer that generated the snippet can view the postboard. In other embodiments, the postboard can be shared with other reviewers, such as based on sharing permissions. For example, certain communications may carry a higher access or clearance level than other communications. Thus, the access or clearance level carried by each reviewer determines what each respective reviewer can view in the shared postboard. In some embodiments, a reviewer that creates a snippet may set access rights, such as by restricting access to a group of reviewers working on a related project. In this way, reviewers can quickly save, identify, retrieve, and share communications.

DEFINITIONS

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Snippet: At least a portion of the content (e.g., text) of a message (e.g., a confidential message) and/or a link to the message from which the portion of the content originates. For example, a snippet can be the highlighted portion of the text of a message and a link to the message.

Postboard: A software facility, such as a database, that can store snippets. Postboard may also refer to a GUI that displays data stored in such a database. For example, a postboard may display at least a portion of the text of a message and a link to the message from which the portion of the text originates (e.g., a snippet). Each snippet can be displayed in a list or other layout. A postboard can be associated with access rights (e.g., user defined, group defined, or system defined) that control sharing of the postboard and/or individual snippets without the postboard.

Message Network System Overview

FIG. 1 illustrates a block diagram of a message reader snippet and postboard system 100 for generating snippets and postboards. The message reader snippet and postboard system 100 comprises one or more companies 110, a reviewer device 132, a reviewer device 134, a message data sever 140, a postboard system 150, and a network 120.

Figure 9:
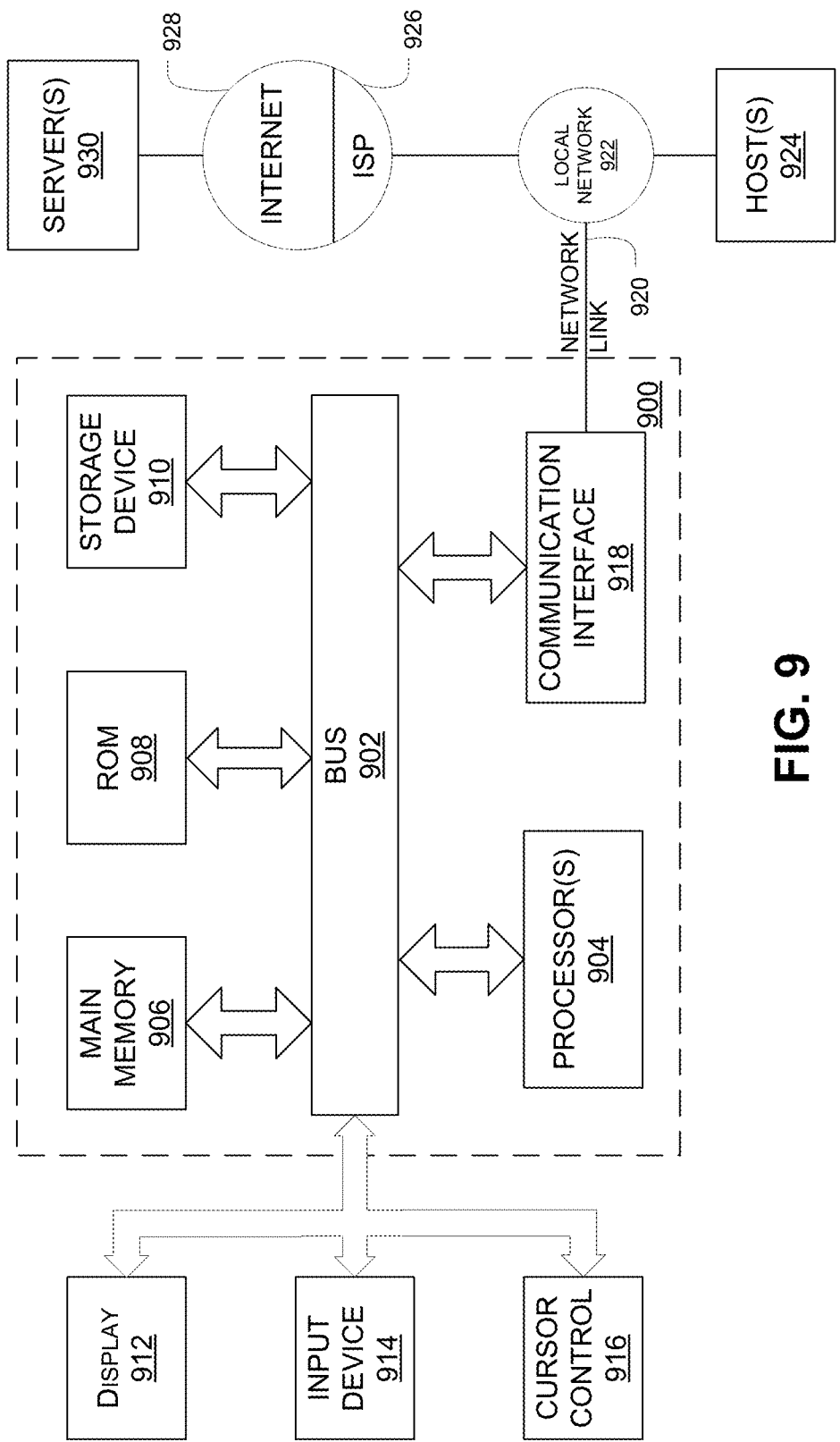
FIG. 9 illustrates one embodiment of a computer system with which certain methods discussed herein may be implemented.

In the embodiment illustrated in FIG. 1, the one or more companies 110, which may be implemented by one or more first physical computing devices, are communicatively connected to message data server 140, which may be implemented by one or more second physical computing devices, over the network 120. Similarly, the reviewer device 132 may be implemented by one or more third physical computing devices and the reviewer device 134 may be implemented by one or more fourth physical computing devices. The reviewer devices 132 and 134 may be communicatively connected to the message data server 140 and the postboard system 150 over the network 120, such as via a secured local area network (LAN) and/or the Internet. In some embodiments, each such physical computing device may be implemented with any combination of the components of the example computer system of FIG. 9. For example, the one or more companies 110, the reviewer device 132, and/or the reviewer device 134 may be implemented in a computer system as a set of program instructions recorded on a machine-readable storage medium.

The one or more companies 110 represent devices operated by employees, contractors, or other personnel associated with a commercial entity, a law firm, a government entity, and/or the like. The employees, contractors, or other personnel associated with a commercial entity, a law firm, a government entity, and/or the like may draft messages (e.g., electronic messages, confidential government cables, etc.) to communicate a field update, gathered information, a news report, and/or the like. These messages may be transmitted to the message data server 140 for storage.

The reviewer devices 132 and 134 represent devices operated by reviewers that review and/or analyze messages received from the message data server 140. For example, the reviewer device 132 is operated by a first reviewer and the reviewer device 134 is operated by a second reviewer. The devices allow the first and second reviewers to generate snippets and store such snippets in one or more postboards stored by the postboard system 150 via a graphical user interface (GUI). For example, the devices may include GUI logic. The GUI logic may be a set of program instructions which, when executed by one or more processors of the reviewer device 132 or 134, are operable to receive user input and to display a graphical representation of the messages using the approaches described herein. The GUI logic may be operable to receive user input from, and display a graphical representation of the messages to, a GUI that is provided on a display (not shown) by the computer system on which the reviewer device 132 or 134 executes.

In some embodiments, the GUI logic is omitted. For example, in one embodiment, the reviewer devices 132 and 134 may comprise an application program or process that issues one or more function calls or application programming interface (API) calls to the message data server 140 and/or the postboard system 150 to obtain information resulting from, to provide input to, and to execute along with the message data server 140 and/or the postboard 150, the processes or one or more steps thereof as described herein. For example, the reviewer device 132 or 134 may request messages using a programmatic interface, and then a reviewer, using the reviewer device 132 or 134, may use, process, log, store, snip, and/or otherwise interact with the messages according to local logic. The reviewer device 132 or 134 may also interact with the postboard system 150 to provide input, to provide snippet storing instructions, to retrieve links to messages, and/or to provide or retrieve other data as described herein using a programmatic interface, and then the postboard system 150 may interact with the messages according to the postboard system 150 logic.

The message data server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof.

When executed by one or more processors of the computer system, logic in the message data server 140 is operable to retrieve and transmit the messages to the reviewer devices 132 and/or 134 according to the techniques described herein. In one embodiment, the message data server 140 may be implemented in a Java Virtual Machine (JVM) that is executing in a distributed or non-distributed computer system. In other embodiments, the message data server 140 may be implemented as a combination of programming instructions written in any programming language (e.g. C++ or Visual Basic) and hardware components (e.g., memory, CPU time) that have been allocated for executing the program instructions.

The postboard system 150 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the postboard system 150 is part of the message data server 140 and/or one the reviewers device 132, 134. For example, the postboard system 150 may be software that is configured for execution on the message data server 140.

When executed by one or more processors of the computer system, logic in the postboard system 150 is operable to receive snippets from the reviewer devices 132 and 134, store snippets, including links to messages from which the snippets originate, in postboards and provide access to the postboards to the reviewer devices 132 and/or 134 according to the techniques described herein. In one embodiment, the postboard system 150 may be implemented in a Java Virtual Machine (JVM) that is executing in a distributed or non-distributed computer system. In other embodiments, the postboard system 150 may be implemented as a combination of programming instructions written in any programming language (e.g. C++ or Visual Basic) and hardware components (e.g., memory, CPU time) that have been allocated for executing the program instructions.

In an embodiment, the network 120 includes any combination of communication networks, such as one or more a local area network (LAN), wide area network (WAN), and/or the Internet. The network 120 may be a wired network, a wireless network, or a combination of the two.

Message Reader Snippets and Postboards

Figure 2:
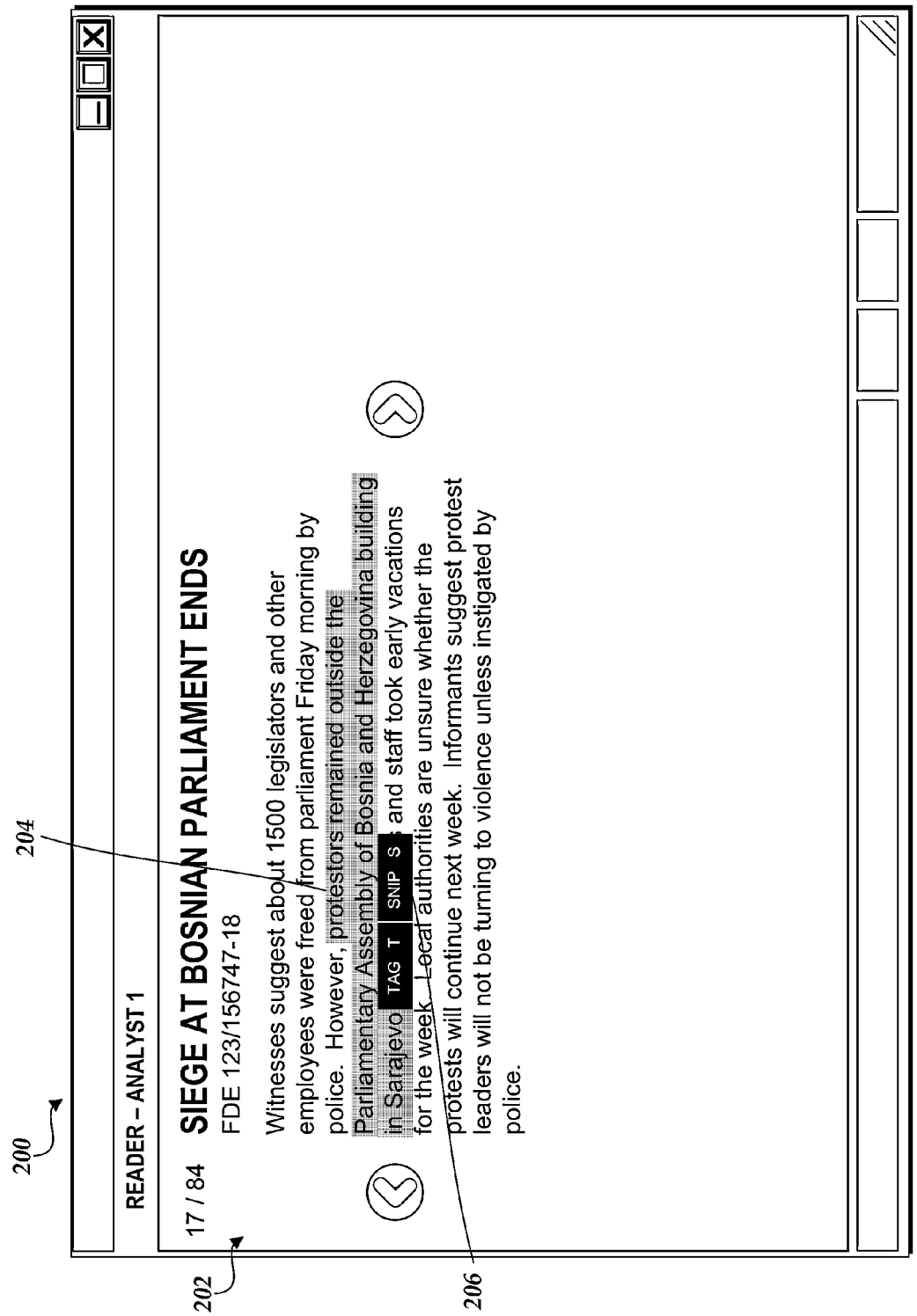
FIG. 2 illustrates an example user interface of the message reader snippet and postboard system in which a portion of a confidential message is highlighted.

FIG. 2 illustrates a sample user interface 200 of the message reader snippet and postboard system 100 in which a portion 204 of a confidential message 202 is highlighted. As an example, and as used herein, the user interface 200 is displayed by the reviewer device 132, which is operated by the first reviewer. However, the techniques and features described herein can be performed by any reviewer device operated by any reviewer. As a further example, the confidential message 202 may be a confidential government cable.

The confidential message 202 is received by the reviewer device 132 from the message data server 140. The confidential message 202 includes text, a portion 204 of which is highlighted. In an embodiment, the portion 204 can be highlighted by the first reviewer using a cursor. The cursor may be a mouse pointer or a finger of the first reviewer (if, for example, the reviewer device 132 provides a touchscreen or other such display). In other embodiments, the portion 204 can be highlighted by the first reviewer using a gesture, voice commands, or other mouse or keyboard inputs.

Once the portion 204 is highlighted, the first reviewer can perform one or more additional tasks. For example, a snip button 206 may appear in the user interface 200 in response to highlighting the portion 204. In an embodiment, the reviewer device is configured to generate a snippet based on the highlighted portion 204 when the snip button 206 is selected. The first reviewer can select the snip button 206 using a mouse command (e.g., hovering over, clicking on, pressing and holding, etc. the snip button 206), a key command (e.g., pressing the letter "s" on a physical or virtual keyboard), a gesture, a voice command, and/or the like. The ways in which the snip button 206 can be selected are described in greater detail below with respect to FIGS. 3A-C.

Figure 3A:
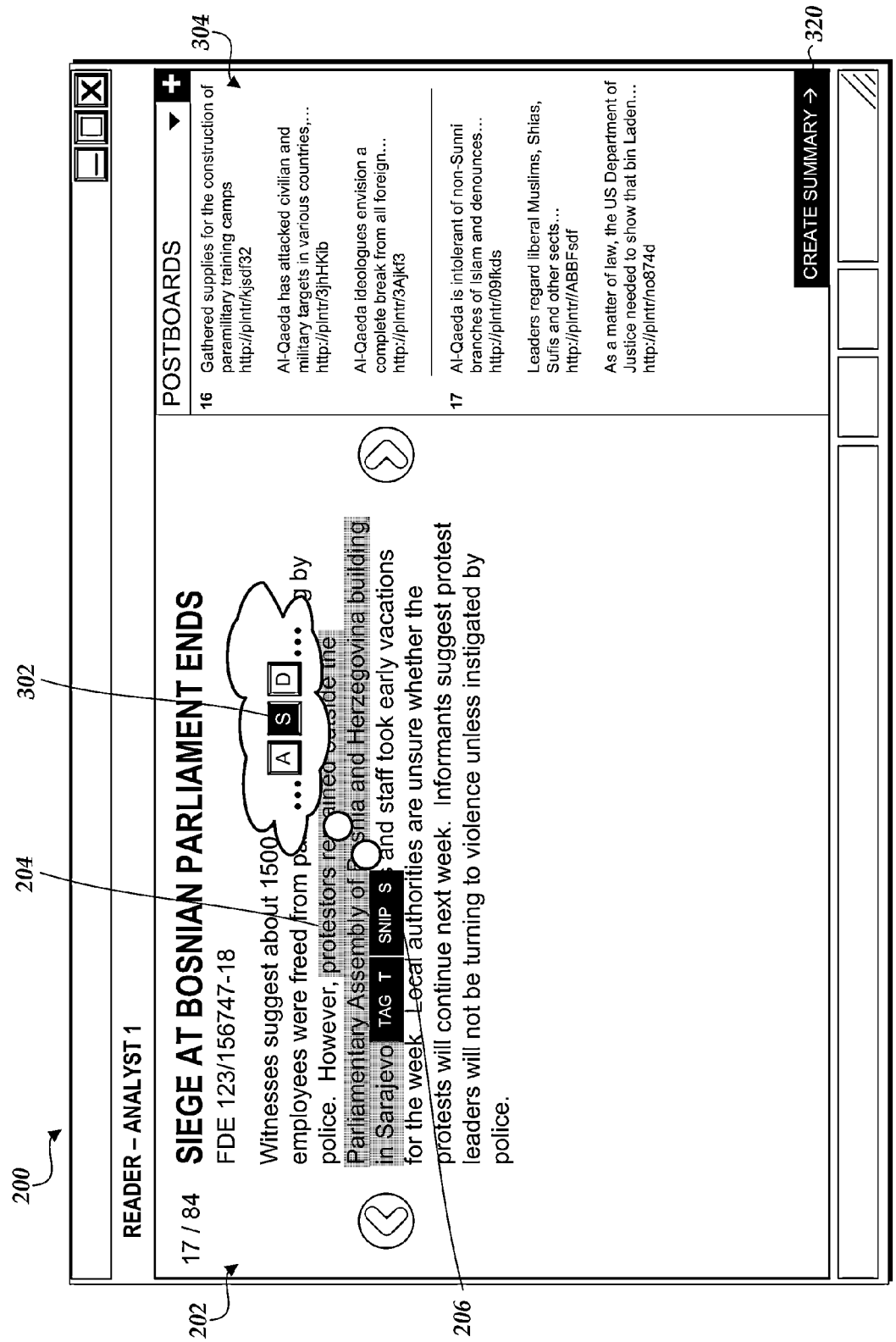

FIGS. 3A-C illustrate example user interfaces 200 of the message reader snippet and postboard system 100 in which a snip command is selected. As illustrated in FIG. 3A, with a portion of the text selected (e.g., highlighted in the example of FIG. 3A), the snip command is selected via the selection of the snip button 206 using key command 302 (e.g., the key associated with the letter "s" on a physical or virtual keyboard).

As illustrated in FIG. 3B, the snip command is selected via selection of the snip button 206 using cursor 306. For example, the first reviewer can use the mouse to place the cursor 306 over the snip button 206. In an embodiment, placing the cursor 306 over the snip button 206 is sufficient to select the snip button 206. In other embodiments, the first reviewer clicks a mouse button while the cursor 306 is placed over the snip button 206 to select the snip button 206.

As illustrated in FIG. 3C, the snip command is selected via the selection of the snip button 206 using finger 308. For example, the reviewer device 132 can include a touchscreen. The first reviewer can use his or her finger 308 to touch and/or hover over the snip button 206. In an embodiment, touching the snip button 206 using the finger 308 is sufficient to select the snip button 206. In other embodiments, hovering over the snip button 206 (e.g., hovering over the snip button 206 within a minimum distance of the touchscreen) using the finger 308 is sufficient to select the snip button 206.

In an embodiment, a postboard 304 is displayed within the user interface 200. The postboard 304 may appear before or after the snip button 206 is selected. For example, the first reviewer can provide an input to view the postboard 304. As another example, the postboard 304 can appear to show that a snippet has been saved into the postboard 304. In the example of FIGS. 3A-C, the postboard 304 appears before the snip button 206 is selected. Accordingly, the postboard 304 does not yet include an entry for the portion 204 of the message 202 that is highlighted.

In a further embodiment, the first reviewer can create a summary of the postboard 304 by selecting summary button 320. As an example, the summary button 320, when selected, can create an exportable file that includes some or all of the information present in the postboard 304. In some instances, the exportable file can include additional information not present in the postboard 304, such as the full snippet text, the full message text, and/or other data. As another example, the summary button 320, when selected, can create a summary of the data included in the postboard 304 and present the summary in a separate window or another window within the user interface 200.

The snippets in the postboard 304 can appear in one of several orders. For example, the snippets can be organized or sorted in alphabetical order (e.g., by the first letter in the snipped portion of text, by the link to the respective message, by the topic or label associated with the snippet, by the reviewer associated with the snippet, etc.), by the topic or label associated with the snippet, by which reviewer generated the snippet, by the time and/or day that the snippet was created, and/or any combination thereof. Any reviewer that has access to the postboard 304 can change the order in which snippets appear. Changing the order of snippets in the postboard 304 by one reviewer does not necessarily change the order of snippets in the postboard 304 when viewed by another reviewer. In one embodiment, reviewers can have preferences for sorting and/or displaying snippets in a postboard that are used for display of any postboards by the particular reviewer.

Furthermore, snippets in the postboard 304 can be grouped together. For example, snippets that share a common topic or label, or that were created by the same reviewer, can be included in the same group. As illustrated in FIGS. 3A-C, the postboard 304 includes two groups: entries 16 and 17. Thus, the snippets displayed in the same group (e.g., entry 16 or 17) may be related. The groups can be organized in the same manner as described above.

In an embodiment, the snippets in the postboard 304 can be further formatted by a reviewer. For example, the font, color, size, and/or aspects of the appearance of the snippets and/or the messages can be modified by the reviewer.

Figure 4:
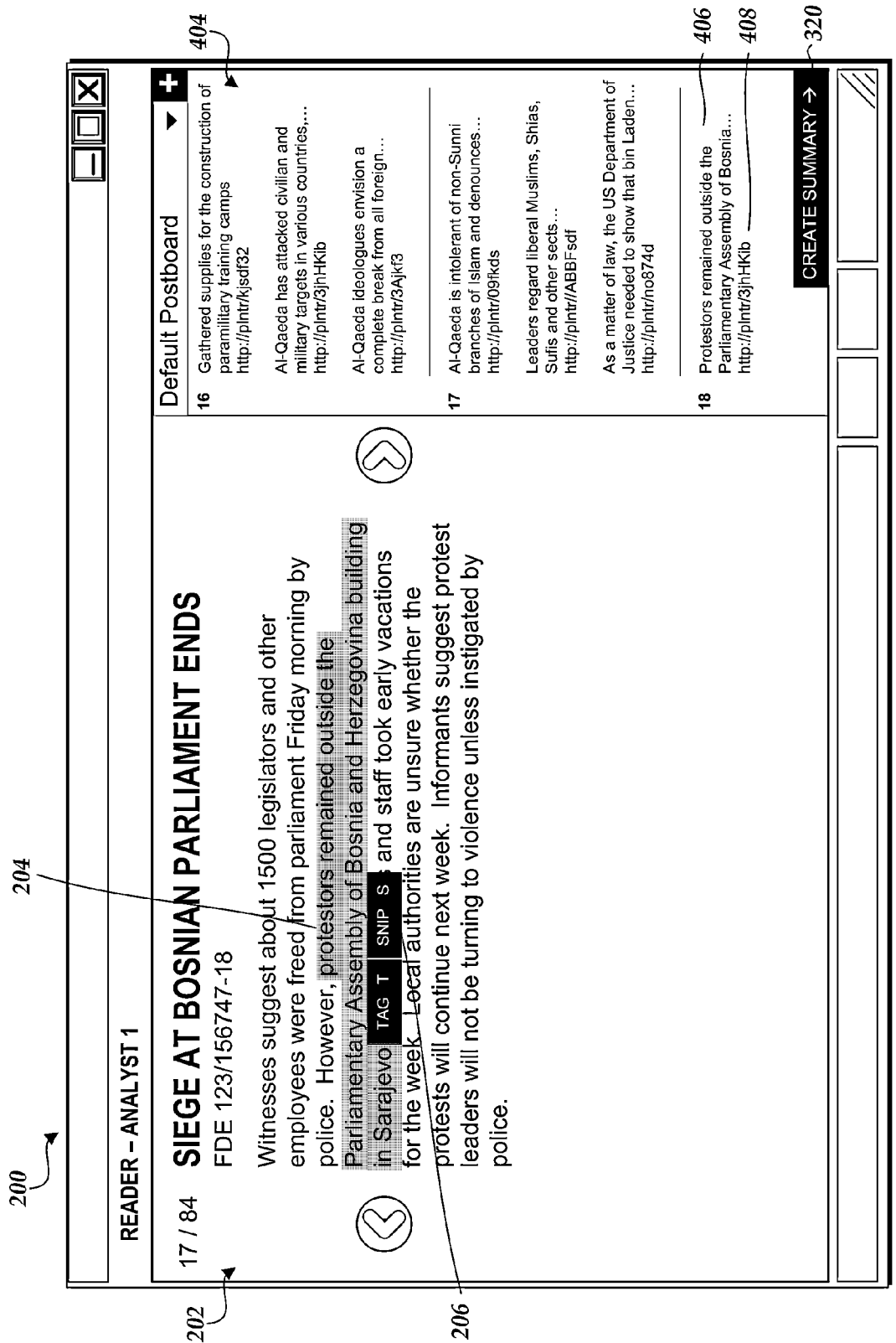
FIG. 4 illustrates an example user interface of the message reader snippet and postboard system in which a default postboard is displayed.

FIG. 4 illustrates the user interface 200 of the message reader snippet and postboard system 100 in which a default postboard 404 is displayed. In an embodiment, when the snip button 206 is selected, the snippet is automatically stored in a default postboard, such as the default postboard 404. For example, the portion 204 is stored as a snippet in entry 18 of the default postboard 404. Entry 18 includes an excerpt 406 of the portion 204 and a link 408 to the message 202. As an example, when the link 408 is selected, the original source of the portion 204 is accessed and the message 202 is displayed in the user interface 200. In another example, the message 202 is stored in a separate data store such that when the link 408 is selected, the message 202 may be retrieved, even if the message 202 is no longer available from the original source.

Figure 5:
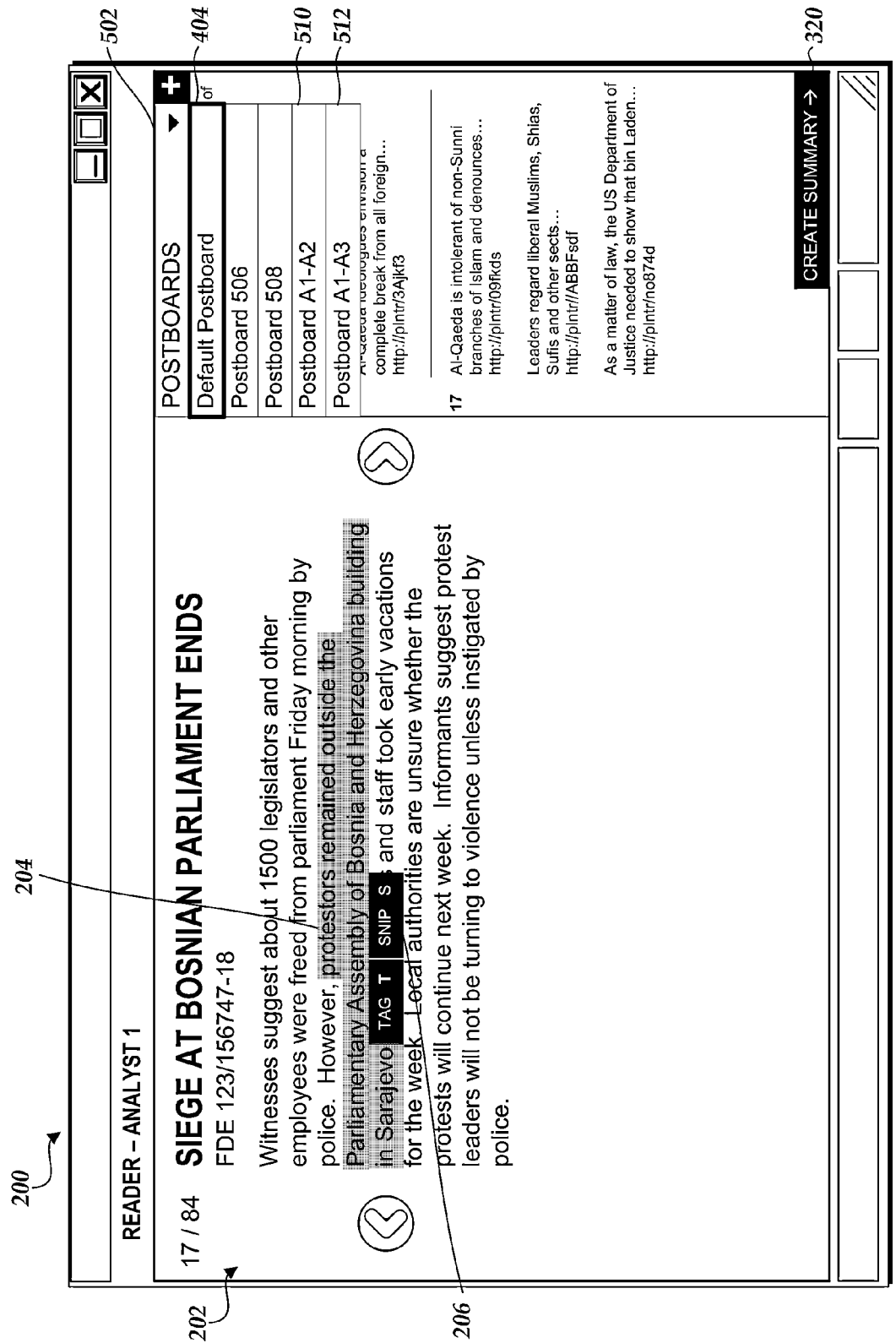
FIG. 5 illustrates an example user interface of the message reader snippet and postboard system in which one of several postboards is selected.

FIG. 5 illustrates the user interface 200 of the message reader snippet and postboard system 100 in which one of several postboards may be selected by the reviewer. As illustrated in FIG. 5, the first reviewer can select one of several postboards in which to store snippets via dropdown menu 502. While FIG. 5 illustrates the dropdown menu 502, this is not meant to be limiting. One of several postboards can be selected in any number of ways, including via checkbox menus, radio button menus, voice commands, a camera that tracks movement of the eyes of the first reviewer, gestures, and/or the like.

The dropdown menu 502 can include one or more entries. For example, the dropdown menu 502 includes default postboard 404, postboard 506, postboard 508, postboard A1-A2 510, and postboard A1-A3 512. Default postboard 404, postboard 506, and postboard 508 may be local to the first reviewer such that no other reviewer can view these postboards. Postboard A1-A2 510 can be shared by the first reviewer and the second reviewer. Thus, the first reviewer and the second reviewer can both add snippets to postboard A1-A2 510. In addition, the first reviewer and the second reviewer may each be able to view any snippets added by the other reviewer. Likewise, postboard A1-A3 512 can be shared by the first reviewer and a third reviewer. Thus, the first reviewer and the third reviewer can both add snippets to postboard A1-A3 512. In addition, the first reviewer and the third reviewer may each be able to view any snippets added by the other reviewer.

In an embodiment, the default postboard 404 is selected in the dropdown menu 502. Accordingly, when the snip button 206 is selected, a snippet is generated and stored in the default postboard 404. In some embodiments, the reviewer can establish rules for automatic selection of postboards for storing snippets. For example, a rule may indicate that snippets of messages associated with a certain organization (e.g., CIA) are automatically stored to a particular postboard (e.g., a CIA reviewers group postboard) having predetermined access rights, possibly in addition to one or more other postboards selected by the reviewer, while snippets of messages associated with another group or topic (e.g., Al Qaeda) are automatically stored to another particular postboard (e.g., a counterterrorism postboard) having different access rights.

Figure 6:
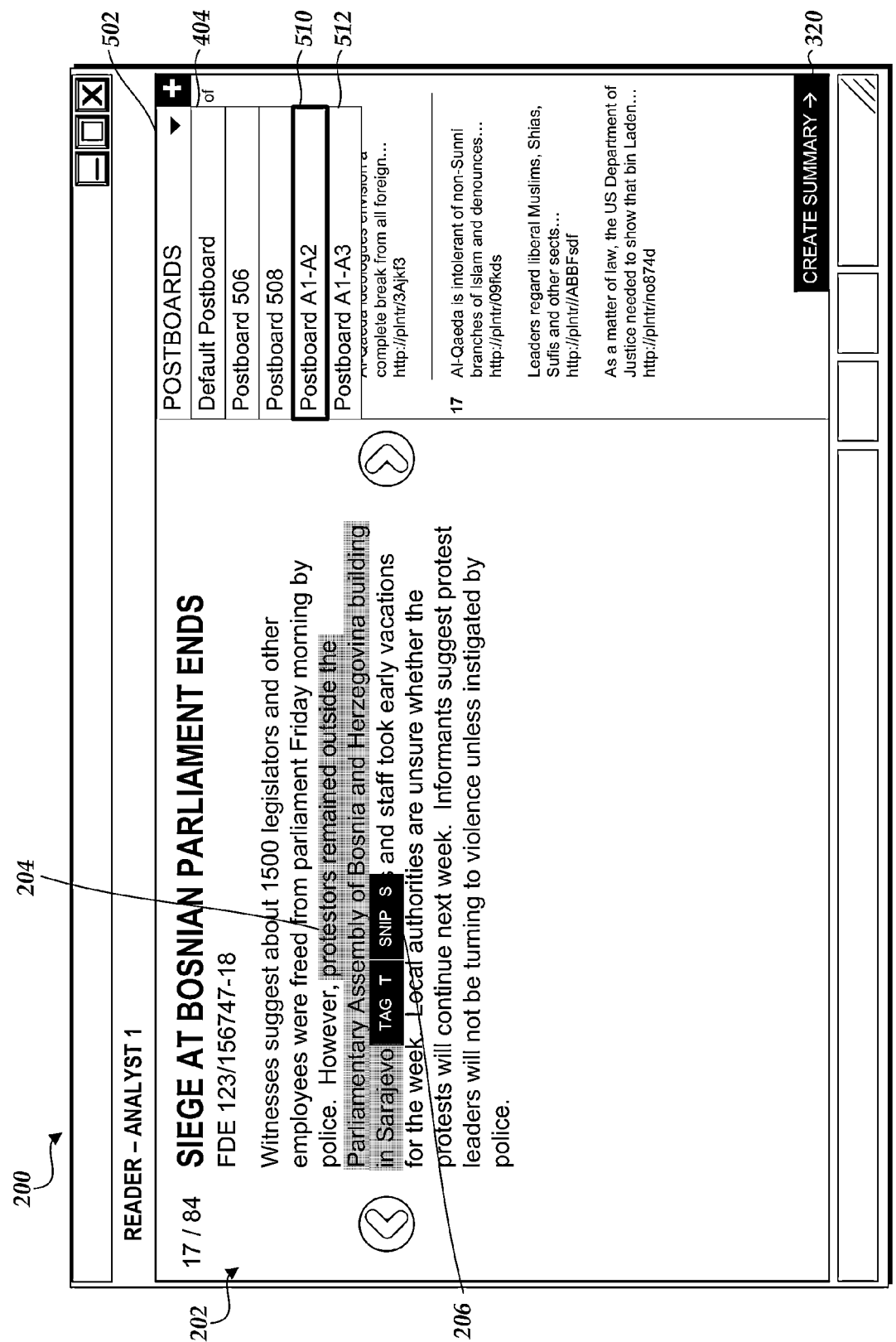
FIG. 6 illustrates an example user interface of the message reader snippet and postboard system in which a postboard shared with another user is selected.

FIG. 6 illustrates a user interface 200 of the message reader snippet and postboard system 100 in which a postboard shared with another user is selected. As illustrated in FIG. 6, the postboard A1-A2 510 is selected in the dropdown menu 502. Accordingly, when the snip button 206 is selected, a snippet is generated and stored in the postboard A1-A2 510.

FIGS. 7A-D illustrate user interfaces 200 and 700 of the message reader snippet and postboard system 100 in which a postboard shared with another user is displayed. In particular, user interfaces 200 and 700 include postboard A1-A2 510, which is shared by the first reviewer and the second reviewer.

Figure 7A:
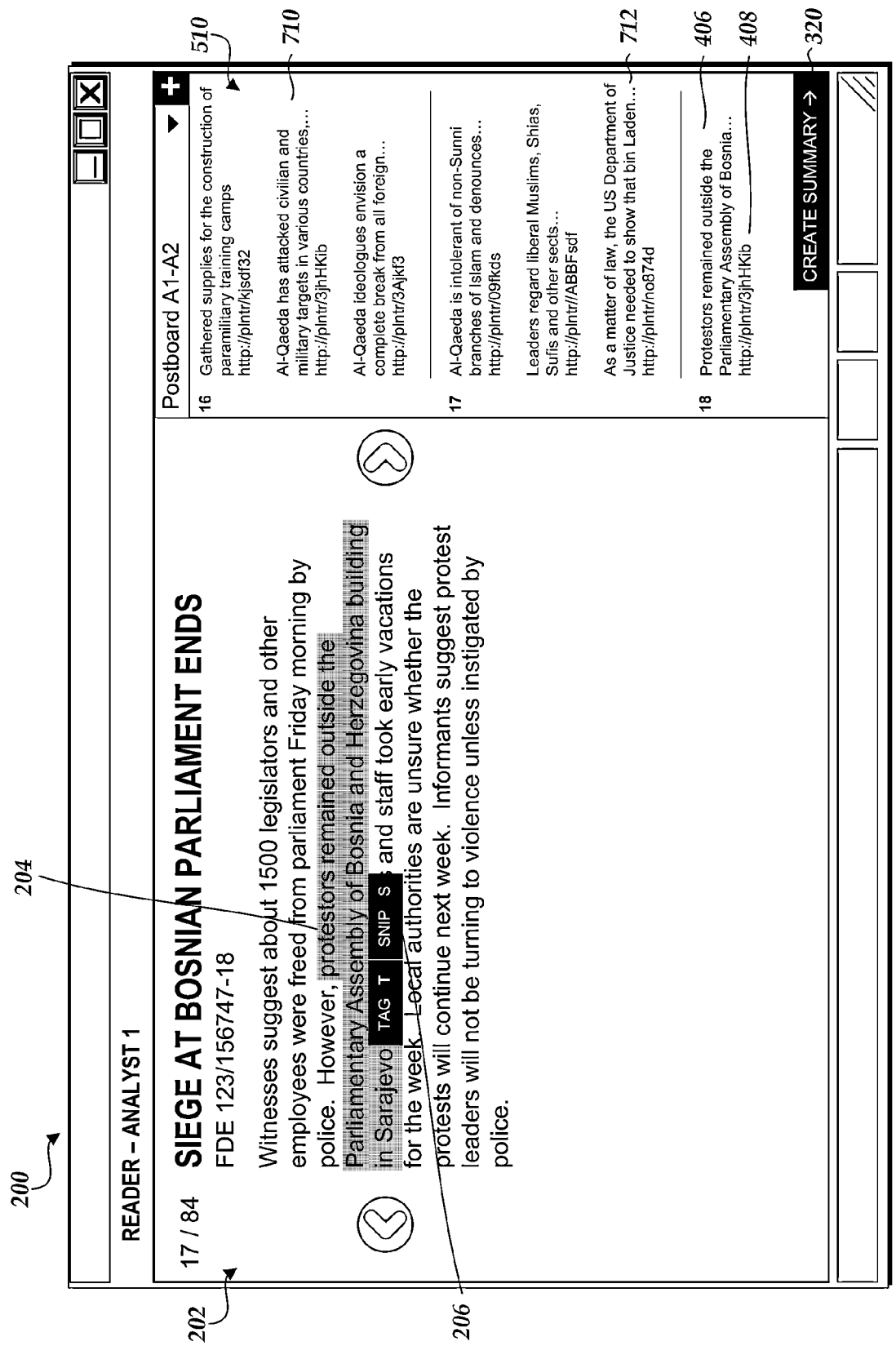

FIG. 7A illustrates the user interface 200, which as noted above, is described herein as being viewed by the first reviewer using the reviewer device 132. Furthermore, as described above, once the snip button 206 is selected, the snippet is generated and stored in the postboard A1-A2 510 in entry 18. The postboard A1-A2 510 may also include entries 16 and 17. Entry 16 may include snippet 710 and entry 17 may include snippet 712.

FIGS. 7B-D illustrate user interface 700, which is viewed by the second reviewer using the reviewer device 134. In an embodiment, each message, and thus each snippet, is associated with an access or clearance level. For example, access or clearance levels can include any security clearance hierarchy, such as "controlled unclassified," "confidential," "secret," and "top secret." A snippet can be viewed by a reviewer if the access or clearance level associated with the snippet is lower or the same as the maximum level of access or clearance held by the reviewer. As noted above, other access rules may also be associated with snippets, messages, reviewers, reviewer groups, etc.

Merely for illustrative purposes, the first reviewer is assumed to have a first level of clearance and the second reviewer is assumed to have a second level of clearance, where the first level of clearance is higher than the second level of clearance. Furthermore, the snippets 710 and 712 are assumed to be associated with the first level of clearance, while the remaining snippets are assumed to be associated with the second level of clearance. Thus, in an embodiment, snippets 710 and 712 (or the messages associated with the snippets 710 and 712) are not available for viewing by the second reviewer. Depending on user preferences (e.g., preferences of the system administrator), the postboard A1-A2 510, then, may include different content when viewed by the first reviewer than when viewed by the second reviewer, even though the postboard A1-A2 510 is shared by both reviewers.

As illustrated in FIG. 7B, snippets 710 and 712 are not present in the postboard A1-A2 510 when viewed by the second reviewer via the user interface 700. The second reviewer, however, can view the message 202 because the message 202 is associated with the second, lower, level of clearance.

As illustrated in FIG. 7C, the postboard A1-A2 510, as viewed by the second reviewer via the user interface 700, includes a placeholder in the location that the snippets 710 and 712 would otherwise by displayed. The placeholder can include a message informing the second reviewer that the second reviewer does not have permission to view the snippet and/or that the second reviewer may contact his or her supervisor if the denial of permission to view either snippet 710 or 712 is in error.

As illustrated in FIG. 7D, the postboard A1-A2 510, as viewed by the second reviewer via the user interface 700, includes a black box in the location that the snippets 710 and 712 would otherwise by displayed. In this way, the second reviewer can be informed that there are additional snippets stored in the postboard A1-A2 510 that the second reviewer does not have permission to view.

In an embodiment, multiple reviewers can view the same message at the same time. For example, when a link to a message is selected, a different instance of the message filed can be opened. As another example, a postboard viewed by the first reviewer can include different links than the same postboard viewed by the second reviewer. Thus, the message data server 140 can include multiple instances of the same message, each instance associated with a unique link.

Example Process Flows

Figure 8:
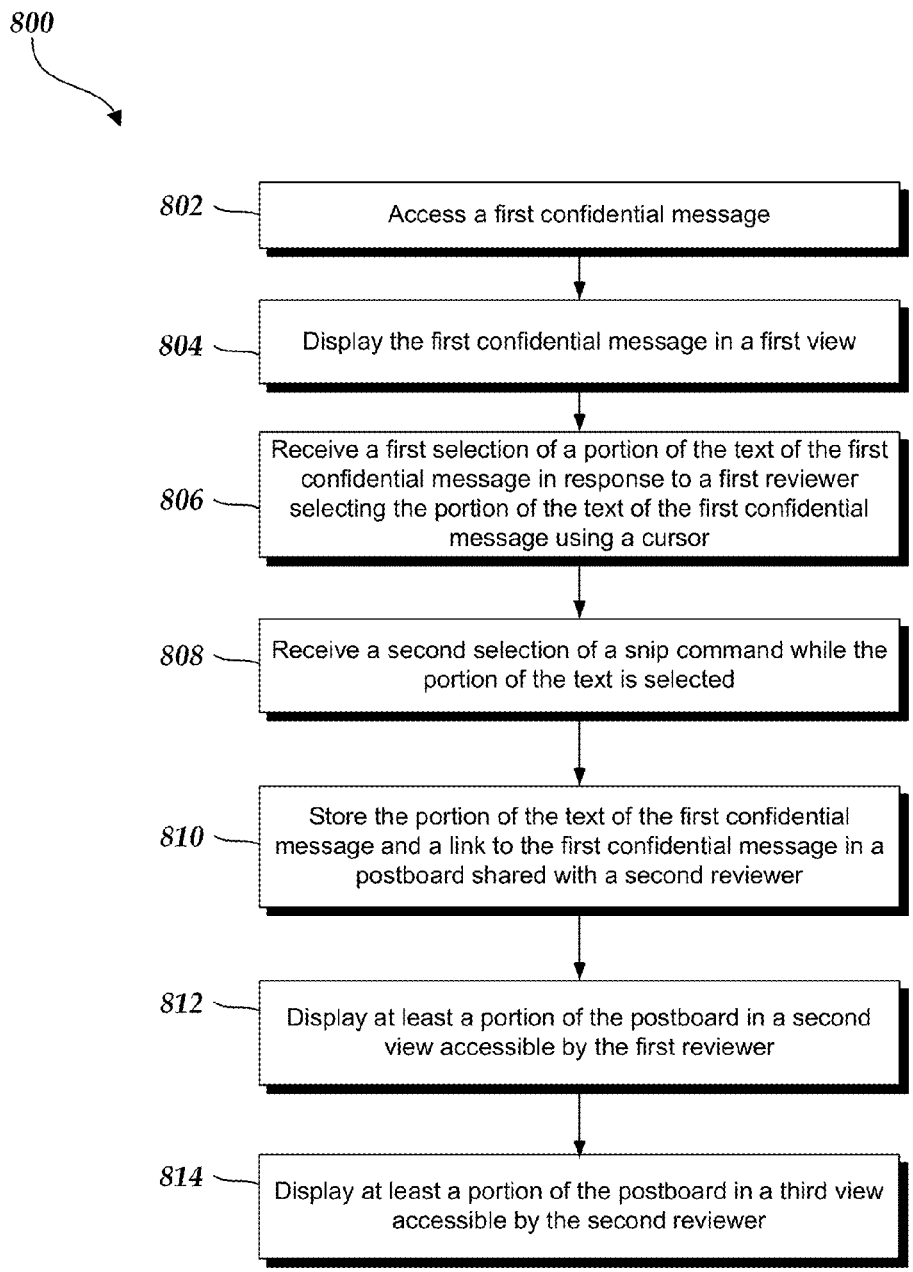
FIG. 8 is a flowchart depicting one embodiment of operations of the message reader snippet and postboard system.

FIG. 8 is a flowchart 800 depicting an illustrative operation of the message reader snippet and postboard system 100. In particular, the flowchart 800 depicts an illustrative operation of the postboard system 150. The method of FIG. 8 may be performed by any one or more of the computing devices illustrated in FIG. 1, such as the postboard server 150, the message data server 140, and/or the reviewer devices 132. Depending on the embodiment, the method of FIG. 8 may include fewer or additional blocks and the blocks may be performed in an order that is different than illustrated.

Beginning in block 802, the message reader snippet and postboard system 100 accesses a first confidential message. For example, the first confidential message may be accessed by the reviewer device 132 from the message data server 140.

In block 804, the reviewer device 132 displays the first confidential message in a first view. The first confidential message may include text that can be highlighted.

In block 806, the reviewer device 132 receives a first selection of a portion of the text of the first confidential message in response to a first reviewer selecting the portion of the text of the first confidential message using a cursor, such as a mouse pointer or a finger of the first reviewer. In a further embodiment, once the portion of the text is selected, a snip button is displayed to the first reviewer. The snip button, when selected, can create a snippet of the portion of the text selected.

In block 808, the reviewer device 132 receives a second selection of a snip command while the portion of the text is selected. In an embodiment, the message reader snippet and postboard system 100 can receive a third selection of a postboard in which to store snippets prior to receiving the second selection.

In block 810, the reviewer device 132 and/or postboard system 100 stores the portion of the text of the first confidential message and a link to the first confidential message in a postboard shared with a second reviewer. In an embodiment, because the postboard is shared with the second reviewer, the second reviewer can also provide instructions or commands such that snippets are stored in the postboard. In one embodiment, the second reviewer may be provided an alert that a new snippet is added to the shared postboard.

In block 812, the reviewer device 132 displays at least a portion of the postboard in a second view accessible by the first reviewer. For example, some snippets stored in the postboard can be associated with an access or clearance level that is higher than a maximum level of access or clearance held by the first reviewer, such as snippets posted by other reviewers. Thus, those snippets associated with the higher level of access or clearance may not be displayed in the second view.

In block 814, the second reviewer device 134 displays at least a portion of the postboard in a third view accessible by the second reviewer. For example, some snippets stored in the postboard can be associated with an access or clearance level that is higher than a maximum level of access or clearance held by the second reviewer. Thus, those snippets associated with the higher level of access or clearance may not be displayed in the third view.

As described above, a confidential message is a type of message. Any discussion herein of a confidential message can apply to any other type of message, such as a confidential government cable. For example, other messages can be confidential or non-confidential and can include electronic messages (e.g., emails, text messages, instant messages, voicemails, reminders or alerts, etc.), presentations, news articles, reports, letters, and/or any other type of communication that includes content.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 14 is a block diagram that illustrates a computer system 900 upon which an embodiment may be implemented. Any of the computing device discussed herein, such as the companies 110, the message data server 140, the postboard system 150, and/or the reviewer devices 132, 134 may include any portion of the components and/or functionality discuss with reference to computer system 900.

The example computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 804 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieve and execute the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Object Centric Data Model

To provide a framework for the above discussion of the specific systems and methods described herein, an example database system using an ontology will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by an ontology. The conceptual data model is independent of any particular database used for durably storing one or more database(s) based on the ontology. For example, each object of the conceptual data model may correspond to one or more rows in a relational database or an entry in Lightweight Directory Access Protocol (LDAP) database, or any combination of one or more databases.

An ontology, as noted above, may include stored information providing a data model for storage of data in a database. The ontology may be defined by one or more object types, which may each be associated with one or more property types. At the highest level of abstraction, data object is a container for information representing things in the world. For example, data object can represent an entity such as a person, a place, an organization, or other noun. Data object can represent an event that happens at a point in time or for a duration. Data object can represent a document or other unstructured data source such as an e-mail message, a news report, or a written paper or article. Each data object is associated with a unique identifier that uniquely identifies the data object within the database system.

Different types of data objects may have different property types. For example, a "Person" data object might have an "Eye Color" property type and an "Event" data object might have a "Date" property type. Each property as represented by data in the database system may have a property type defined by the ontology used by the database.

Objects may be instantiated in the database in accordance with the corresponding object definition for the particular object in the ontology.

The data objects defined in the ontology may support property multiplicity. In particular, a data object may be allowed to have more than one property of the same property type. For example, a "Person" data object might have multiple "Address" properties or multiple "Name" properties.

Each link represents a connection between two data objects. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object can have multiple links with another data object to form a link set. For example, two "Person" data objects representing a husband and a wife could be linked through a "Spouse Of" relationship, a matching "Address" property, and one or more matching "Event" properties (e.g., a wedding). Each link as represented by data in a database may have a link type defined by the database ontology used by the database.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to display a large amount of dynamically updating data, the computing system comprising:
   a network interface that is coupled to a data network for receiving and transmitting one or more packet flows;
   a computer processor; and
   a computer readable storage medium storing program instructions configured for execution by the computer processor in order to cause the computing system to:
   access a first confidential message, wherein the first confidential message comprises text, and wherein the first confidential message is associated with a first access level;
   display the first confidential message in a first view;
   receive a first selection of a portion of the text of the first confidential message in response to a first reviewer selecting the portion of the text of the first confidential message using a cursor, wherein the first reviewer is associated with the first access level;
   receive a second selection of a snip command while the portion of the text is selected;
   store the portion of the text of the first confidential message and a link to the first confidential message in a postboard shared with a second reviewer, wherein the second reviewer is associated with a second access level that is lower than the first access level;
   display at least a portion of the postboard in a second view accessible by the first reviewer;
   display at least a portion of the postboard in a third view accessible by the second reviewer; and
   display a message that the portion of the text of the first confidential message and the link to the first confidential message is not available for viewing in the third view.

2. The computing system of claim 1, wherein the one or more stored program instructions further cause the processor to:
   display the portion of the text of the first confidential message and the link to the first confidential message in the second view; and
   not display the portion of the text of the first confidential message and the link to the first confidential message in the third view.

3. The computing system of claim 1, wherein the one or more stored program instructions further cause the processor to
   display the portion of the text of the first confidential message and the link to the first confidential message in the second view.

4. The computing system of claim 1, wherein the one or more stored program instructions further cause the processor to:

receive a third selection of a second postboard after receiving the first selection, wherein the second postboard is shared with the second reviewer; and store the portion of the text of the first confidential message and the link to the first confidential message in the second postboard in response to receiving the second selection.

5. The computing system of claim 1, wherein the second selection is received in response to the first reviewer selecting a key command while the portion of the text of the first confidential message is selected.

6. The computing system of claim 1, wherein the cursor comprises at least one of a mouse pointer or a finger of the first reviewer.

7. A computer-implemented method of displaying a large amount of dynamically updating data, the computer-implemented method comprising:

as implemented by one or more computer systems comprising computer hardware and memory, the one or more computer systems configured with specific executable instructions, accessing a first message associated with a first access level and comprising text;

displaying the first message in a first view;

receiving a first selection of a portion of the text of the first message in response to a first user selecting the portion of the text of the first message using a cursor, wherein the first user is associated with the first access level;

receiving a second selection of a command while the portion of the text is selected;

storing the portion of the text of the first message and a link to the first message in a data store accessible by both the first user and a second user, wherein the second user is associated with a second access level that is not authorized to access content associated with the first access level;

displaying at least a first portion of the data store in a second view accessible by the first user;

displaying at least a second portion of the data store in a third view accessible by the second user; and displaying a second message that the portion of the text of the first message is not available for viewing in the third view.

8. The computer-implemented method of claim 7, further comprising:

displaying the portion of the text of the first message and the link to the first message in the second view; and not displaying the portion of the text of the first message and the link to the first message in the third view.

9. The computer-implemented method of claim 7, further comprising displaying the portion of the text of the first message and the link to the first message in the second view.

10. The computer-implemented method of claim 7, further comprising:

receiving a third selection of a second data store after receiving the first selection, wherein the second data store is shared with the second user; and storing the portion of the text of the first message and the link to the first message in the second data store in response to receiving the second selection.

11. The computer-implemented method of claim 7, wherein receiving a second selection comprises receiving the second selection in response to the first user selecting a key command while the portion of the text of the first message is selected.

12. The computer-implemented method of claim 7, wherein the cursor comprises at least one of a mouse pointer or a finger of the first user.

13. A non-transitory computer-readable medium comprising one or more program instructions recorded thereon, the instructions configured for execution by a computing system comprising one or more processors in order to cause the computing system to:

access a first message associated with a first access level and comprising text;

display the first message in a first view;

receive a first selection of a portion of the text of the first message in response to a first reviewer selecting the portion of the text of the first message, wherein the first reviewer is associated with the first access level;

receive a second selection of a command while the portion of the text is selected;

store the portion of the text of the first message and a link to the first message in a data store accessible by both the first reviewer and a second reviewer, wherein the second reviewer is associated with a second access level that is not authorized to access content associated with the first access level;

display at least a portion of the data store in a second view accessible by the first reviewer;

display at least a portion of the data store in a third view accessible by the second reviewer; and display a second message that the portion of the text of the first message is not available for viewing in the third view.

14. The medium of claim 13, wherein the instructions are further configured to cause the computing system to:

display the portion of the text of the first message and the link to the first message in the second view; and not display the portion of the text of the first message and the link to the first message in the third view.

15. The medium of claim 13, wherein the instructions are further configured to cause the computing system to display the portion of the text of the first message and the link to the first message in the second view.

16. The medium of claim 13, wherein the instructions are further configured to cause the computing system to:

receive a third selection of a second data store after receiving the first selection, wherein the second data store is shared with the second user; and store the portion of the text of the first message and the link to the first message in the second data store in response to receiving the second selection.

17. The medium of claim 13, wherein the second selection is received in response to the first user selecting a key command while the portion of the text of the first message is selected.

* * * * *